US007546947B1

(12) United States Patent  (10) Patent No.: US 7,546,947 B1
Arias  (45) Date of Patent: *Jun. 16, 2009

(54) MULTI-FUNCTION TRANSACTION PROCESSING SYSTEM

(76) Inventor: Luis A. Arias, 11600 NW. 34 St., Miami, FL (US) 33178

( * ) Notice: Subject to any disclaimer, the term of this patent is extended or adjusted under 35 U.S.C. 154(b) by 648 days.

This patent is subject to a terminal disclaimer.

(21) Appl. No.: 11/249,177

(22) Filed: Oct. 11, 2005

Related U.S. Application Data

(63) Continuation-in-part of application No. 10/637,799, filed on Aug. 8, 2003, which is a continuation-in-part of application No. 10/120,896, filed on Apr. 11, 2002, now Pat. No. 7,181,416, which is a continuation-in-part of application No. 09/588,917, filed on Jun. 8, 2000, now Pat. No. 6,651,885.

(51) Int. Cl.
*G06K 15/00* (2006.01)
(52) U.S. Cl. ..................................... 235/383; 235/380
(58) Field of Classification Search ................. 235/380, 235/381, 383, 375; 705/1, 16, 44
See application file for complete search history.

(56) References Cited

U.S. PATENT DOCUMENTS

| | | | |
|---|---|---|---|
| 4,359,631 A | 11/1982 | Lockwood et al. | |
| 4,399,510 A | 8/1983 | Hicks | |
| 4,567,359 A | 1/1986 | Lockwood | |
| 4,783,064 A | 11/1988 | Hayashi | |
| 4,818,854 A | 4/1989 | Davies et al. | |
| 4,872,660 A | 10/1989 | Kameyama et al. | |

(Continued)

FOREIGN PATENT DOCUMENTS

EP  0 406 841 A1  1/1991

(Continued)

OTHER PUBLICATIONS

U.S. District Court—S.D of Florida (Miami), Civil Docket for Case No. 03-CV-23400, *Exigent Technology* v. *Prepaid Network, et al.* (Dated Aug. 31, 2006 / Miami, FL).

(Continued)

*Primary Examiner*—Karl D. Frech
(74) *Attorney, Agent, or Firm*—Malloy & Malloy, P.A.

(57) ABSTRACT

A multi-function transaction processing system comprising a transaction terminal that includes a plurality of data entry facilities and a transaction processor, the transaction processor being communicatively associated with a control processor, and the first of data entry facility including a payment authority input structured to accept a payment authority. The second, customer data entry facilities include a customer interface structured to be accessed by a customer, and have a display associated therewith. Furthermore, the transaction processor is responsive to customer inputs via the customer interface of the customer data entry and is structured to provide the customer with a plurality of selections on the display, the control processor defining a user account in accordance with a customer selection and to issue an authorization code associated with the user account. Preferably the user account includes value defined by said payment authority, the authorization code structured to facilitate a transaction in accordance with the defined value, and a printer assembly communicatively associated with the transaction terminal generates a card assembly bearing the user account information.

15 Claims, 3 Drawing Sheets

U.S. PATENT DOCUMENTS

| | | | |
|---|---|---|---|
| 4,877,947 A | 10/1989 | Mori | |
| 4,908,761 A | 3/1990 | Tai | |
| 4,951,308 A | 8/1990 | Bishop et al. | |
| 5,076,562 A | 12/1991 | Sai et al. | |
| 5,145,160 A | 9/1992 | Nagashima et al. | |
| 5,146,067 A | 9/1992 | Sloan et al. | |
| 5,156,385 A | 10/1992 | Muto et al. | |
| 5,243,174 A | 9/1993 | Veeneman et al. | |
| 5,250,789 A | 10/1993 | Johnsen | |
| 5,285,382 A | 2/1994 | Muehlberger et al. | |
| 5,299,796 A | 4/1994 | Wooldridge | |
| 5,513,117 A | 4/1996 | Small | |
| 5,557,518 A | 9/1996 | Rosen | |
| 5,577,109 A | 11/1996 | Stimson et al. | |
| 5,578,808 A | 11/1996 | Taylor | |
| 5,621,787 A | 4/1997 | McKoy et al. | |
| 5,627,356 A | 5/1997 | Takemoto et al. | |
| 5,637,845 A | 6/1997 | Kolls | |
| 5,673,309 A | 9/1997 | Woynoski et al. | |
| 5,681,787 A | 10/1997 | Seamans et al. | |
| 5,684,291 A | 11/1997 | Taskett | |
| 5,687,087 A | 11/1997 | Taggart | |
| 5,696,908 A | 12/1997 | Muehlberger et al. | |
| 5,721,768 A | 2/1998 | Stimson et al. | |
| 5,722,067 A | 2/1998 | Fougnies et al. | |
| 5,778,313 A | 7/1998 | Fougnies | |
| 5,828,740 A | 10/1998 | Khuc et al. | |
| 5,845,259 A | 12/1998 | West et al. | |
| 5,854,975 A | 12/1998 | Fougnies et al. | |
| 5,868,236 A | 2/1999 | Rademacher | |
| 5,884,292 A | 3/1999 | Baker et al. | |
| 5,892,827 A | 4/1999 | Beach et al. | |
| 5,903,633 A | 5/1999 | Lorsch | |
| 5,970,469 A | 10/1999 | Scroggie et al. | |
| 5,980,011 A | 11/1999 | Cummins et al. | |
| 5,988,509 A | 11/1999 | Taskett | |
| 5,991,380 A | 11/1999 | Bruno et al. | |
| 5,991,749 A | 11/1999 | Morrill, Jr. | |
| 5,999,914 A | 12/1999 | Blinn et al. | |
| 6,032,859 A | 3/2000 | Muehlberger et al. | |
| 6,035,025 A | 3/2000 | Hanson | |
| 6,050,493 A | 4/2000 | Fertig | |
| 6,081,791 A | 6/2000 | Clark | |
| 6,105,009 A | 8/2000 | Cuervo | |
| 6,149,055 A | 11/2000 | Gatto | |
| 6,152,029 A | 11/2000 | Templeton | |
| 6,155,487 A | 12/2000 | Dean et al. | |
| 6,169,975 B1 | 1/2001 | White et al. | |
| 6,269,343 B1 | 7/2001 | Pallakoff | |
| 6,308,887 B1 | 10/2001 | Korman et al. | |
| 6,318,536 B1 | 11/2001 | Korman et al. | |
| 6,402,039 B1 | 6/2002 | Freeman et al. | |
| 6,405,182 B1 | 6/2002 | Cuervo | |
| 6,431,537 B1 | 8/2002 | Meier | |
| 6,457,886 B1 | 10/2002 | Meier | |
| 6,513,710 B1 | 2/2003 | Haas | |
| 6,526,130 B1 | 2/2003 | Paschini | |
| 6,575,361 B1 | 6/2003 | Graves et al. | |
| 6,651,885 B1 * | 11/2003 | Arias | 235/381 |
| 6,659,259 B2 | 12/2003 | Knox et al. | |
| 6,688,740 B2 | 2/2004 | Driggers | |
| 7,181,416 B2 * | 2/2007 | Arias | 705/24 |
| 2001/0023415 A1 | 9/2001 | Keil | |
| 2002/0121545 A1 | 9/2002 | Eguchi et al. | |
| 2002/0165820 A1 | 11/2002 | Anvekar et al. | |
| 2003/0106934 A1 | 6/2003 | McCall et al. | |
| 2003/0163425 A1 | 8/2003 | Cannon, Jr. | |
| 2004/0122753 A1 | 6/2004 | Yap et al. | |

FOREIGN PATENT DOCUMENTS

| | | |
|---|---|---|
| EP | 0 527 639 A2 | 2/1993 |
| EP | 0 627 714 A2 | 12/1994 |
| FR | 2 779 381 A1 | 12/1999 |
| GB | 2 338 814 A | 12/1999 |
| JP | 01261799 A | 10/1989 |
| JP | 11134539 A | 5/1999 |
| JP | 2000099811 A | 4/2000 |
| KR | 2001074614 A | 8/2001 |
| WO | WO 95/12169 | 5/1995 |
| WO | WO 96/38801 | 12/1996 |
| WO | WO 96/41462 | 12/1996 |
| WO | WO 97/30409 | 8/1997 |
| WO | WO 98/47112 | 10/1998 |
| WO | WO 98/47116 | 10/1998 |
| WO | WO 99/23622 | 5/1999 |
| WO | WO 99/25106 | 5/1999 |
| WO | WO 99/62038 | 12/1999 |
| WO | WO 00/79492 A1 | 12/2000 |
| WO | WO 01/43095 A2 | 6/2001 |
| WO | WO 01/91070 A3 | 11/2001 |
| WO | WO 01/95264 A2 | 12/2001 |

OTHER PUBLICATIONS

Complaint [Case No. 03-CV-23400 / Filed Dec. 24, 2003/ Miami, FL].

Defendants', Prepaid Network Corp and Johnny Morales, Answer, Affirmative Defenses and Counterclaims [Case No. 03-CV-23400 / Filed Aug. 2, 2004 /Miami, FL].

Plaintiff's Denial of Defendants' . . . Affirmative Defenses & Answer to Counterclaims [Case No. 03-CV-23400 / Filed Aug. 20, 2004/ Miami, FL].

Memorandum of Law in Support of Motions by the Defendants . . . for Judicial Notice and Summary Judgment [Case No. 03-CV-23400 / Served Jan. 31, 2005 / Miami, FL].

Motion For Summary Judgment by the Defendants Prepaid Network, Corp. and Johhny Morales [Case No. 03-CV-23400 / Filed Jan. 31, 2005 / Miami, FL].

Notice of Filing Plaintiff's Expert Report [Case No. 03-CV-23400 / Served Feb. 14, 2005 / Miami, FL].

Plaintiff's Opening Markman Brief [Case No. 03-CV-23400 / Filed Feb. 22, 2005 / Miami, FL].

Amended Motion for Summary Judgment by the Defendants Prepaid Network, Corp. and Johhny Morales [Case No. 03-CV-23400 / Filed Mar. 3, 2005 / Miami, FL].

Rebuttle to the Plaintiff's Markman Brief by the Defendants Prepaid Network, Corp. and Johhny Morales [Case No. 03-CV-23400 / Filed Mar. 4, 2005 / Miami, FL].

Amended Motion for Summary Judgment by the Defendants Prepaid Network, Corp. and Johhny Morales [Case No. 03-CV-23400 / Filed Mar. 11, 2005 / Miami, FL].

Second Amended Motion for Summary Judgment by the Defendants Prepaid Network, Corp. and Johhny Morales [Case No. 03-CV-23400 / Filed Mar. 11, 2005 / Miami, FL].

Affidavit in Support of Defendant's Motion for Summary Judgment [Case No. 03-CV-23400 / Filed Mar. 11, 2005 / Miami, FL].

Plaintiff's Motion to Strike Defendants' Rebuttal to the Plaintiff's Markman Brief [Case No. 03-CV-23400 / Filed Mar. 17, 2005 / Miami, FL].

P's Opposition to D's 4th Motion for Summary Judgment & Request for Attorneys Fees . . . for Ds' Discovery Violations [Case No. 03-CV-23400 / Filed Mar. 21, 2005 / Miami, FL].

Reply in Support of Defendants' Second Amended Motion for Summary Judgment [Case No. 03-CV-23400 / Filed Mar. 25, 2005 / Miami, FL].

Response to Plaintiff's Motion to Strike Defendants' Rebuttal to the Plaintiff's Markman Brief [Case No. 03-CV-23400 / Served Mar. 30, 2005 / Miami, FL].

Plaintiff's Memorandum of Law in Opposition to Defendants' Motion for a Protective Order [Case No. 03-CV-23400 / Filed Apr. 1, 2005 / Miami, FL].
Joint Pretrial Stipulation [Case No. 03-CV-23400 / Served Apr. 4, 2005 / Miami, FL].
Defendants' Motion for a Daubert Hearing Regarding Plaintiff's Expert Witness, Martin M. Zoltick . . . [Case No. 03-CV-23400 / Served Apr. 7, 2005 / Miami, FL].
Plaintiff's Reply Memorandum in Support of its Motion to Strike Defendants' Rebuttal to Plaintiff's Markman Brief [Case No. 03-CV-23400 / Served Apr. 8, 2005 / Miami, FL].
Defendants', Prepaid and Morales, Proposed Findings of Fact and Conclusions of Law [Case No. 03-CV-23400 / Filed Apr. 11, 2005 / Miami, FL].
Plaintiff's Opposition to Defendants' Motion for a Daubert Hearing Regarding Plaintiff's Expert Witness Martin Zoltick [Case No. 03-CV-23400 / Filed Apr. 22, 2005 / Miami, FL].
P's Motion In Limine & Inc'd Memo . . . to Exclude Exhibits & Witnesses . . . & . . . Other Inadmissible Evidence [Case No. 03-CV-23400 / Filed Apr. 26, 2005 / Miami, FL].
Reply in Support of Defendants' Motion for a Daubert Hearing Regarding Plaintiff's Expert Witness Martin Zoltick [Case No. 03-CV-23400 / Filed May 2, 2005 / Miami, FL].
Defendants' Response to Plaintiff's Motion in Limine [Case No. 03-CV-23400 / Served May 13, 2005 / Miami, FL].
Plaintiff's Notice to Defendant to Produce at Hearing [Case No. 03-CV-23400 / Filed Jul. 6, 2005 / Miami, FL].
U.S. District Court—S.D. of Florida (Miami), Civil Docket for Case No. 04-CV-20415, Exigent Technology et al v. Family Dollar Stores et al (Dated Aug. 31, 2006 / Miami, FL).
Complaint [Case No. 04-CV-20415 / Filed Feb. 20, 2004 / Miami, FL].
Order On Defendants' Motion To Transfer [Case No. 04-CV-20415 / Aug. 27, 2004 / Miami, FL].
U.S. District Court—S.D. of Florida (Miami), Civil Docket for Case No. 04-CV-20484, Exigent Technology v. Atrana Solutions (Dated Aug. 31, 2006 / Miami, FL ).
Complaint [Case No. 04-CV-20484 / Filed Mar. 2, 2004 / Miami, FL].
Defendant's, Atrana Solutions, Inc., Answer, Affirmative Defenses and Counterclaims to Plaintiff's Complaint [Case No. 04-CV-20484 / Served May 28, 2004 / Miami, FL].
Defendants' Rule 26 (a) (1) Initial Disclosures [Case No. 04-CV-20484 / Filed Jun. 21, 2004 / Miami, FL].
Plaintiffs Answer To Defendant's Counterclaim [Case No. 04-CV-20484 / Served Jun. 28, 2004 / Miami, FL].
Markman Brief [Case No. 04-CV-20484 / Filed Aug. 27, 2004 / Miami, FL].
Plaintiff Exigent Technology, Inc.'s Markman Brief on Claim Construction [Case No. 04-CV-20484 / Served Aug. 27, 2004 / Miami, FL].
Transcript of Markman Hearing Before The Honorable Marcia G. Cooke . . . (Note: pp. 2, 5 & 8-11 missing from document) [Case No. 04-CV-20484 / Dated Aug. 30, 2004 / Miami, FL].
Supplementary Brief Of Plaintiff [Case No. 04-CV-20484 / Filed Sep. 1, 2004 / Miami, FL].
Defendant's Reply to the Supplementary Brief of Plaintiff [Case No. 04-CV-20484 / Served Sep. 8, 2004 / Miami, FL].
Defendant's Motion To Strike Certain Statements From the Supplementary Brief of Plaintiff [Case No. 04-CV-20484 / Served Sep. 8, 2004 / Miami, FL].
Plaintiff's Reply to Defendant's Motion to Strike Certain Statements From the Supplementary Brief of Plaintiff [Case No. 04-CV-20484 / Served Sep. 17, 2004 / Miami, FL].
Defendant's Motion for Summary Judgment and Supporting Memorandum of Law [Case No. 04-CV-20484 / Filed Sep. 24, 2004 / Miami, FL].
Plaintiff's Response to Defendant's Reply to the Supplementary [Markman] Brief of Plaintiff [Case No. 04-CV-20484 / Filed Sep. 27, 2004 / Miami, FL].
Defendant's Motion to Strike Plaintiff's Response to Defendant's Reply to the Supplementary Brief of Plaintiff [Case No. 04-CV-20484 / Served Oct. 7, 2004 / Miami, FL].
Expert Report of Enrique Lopez [Case No. 04-CV-20484 / Filed Oct. 8, 2004 / Miami, FL].
Defendant's Mediator Summary [Case No. 04-CV-20484 / Served Nov. 1, 2004 / Miami, FL].
Amended Order Granting D's Motion for Summary Judgment and Denying all Pending Motion as Moot [Case No. 04-CV-20484 / Filed Nov. 29, 2004 / Miami, FL].
Atrana's Memorandum of Law in Opposition to P's Motion to Vacate Summary Judgment & Enforce Settlement Agreement [Case No. 04-CV-20484 / Filed Apr. 19, 2006 / Miami, FL ].
P's Notice of Filing Support for Motion to Enforce S. A., Vacate Order Granting Sum Judgment (D. E.89) & to Dismiss Case [Case No. 04-CV-20484 / Filed Apr. 19, 2006 / Miami, FL.
Order [Case No. 04-CV-20484 / Filed Apr. 27, 2006 / Miami, FL].
Final Judgment [Case No. 04-CV-20484 / Filed May 22, 2006 / Miami, FL].
Amended Notice of Appeal [Case No. 04-CV-20484 / Dated May 24, 2006 / Miami, FL].
U.S. District Court—S.D. of Florida (Miami), Civil Docket for Case No. 04-CV-22140, Exigent Technology v. Radiant Telecom, Inc., et al. (Dated Aug. 31, 2006 / Miami, FL).
Complaint [Case No. 04-CV-22140 / Filed Aug. 25, 2004 / Miami, FL].
Answer, Affirmative Defenses & Counterclaims by Ds Radiant Telecom, Inc., Iprepay, Inc., and Ntera Holdings, Inc. [Case No. 04-CV-22140 / Filed Oct. 4, 2004 / Miami, FL].
Plaintiff's Answer to Counterclaims of Radiant Telecom, Inc., IPrepay, Inc., and Ntera Holdings, Inc., [Case No. 04-CV-22140 / Filed Oct. 25, 2004 / Miami, FL].
First Amended Complaint [Case No. 04-CV-22140 / Filed Nov. 5, 2004 / Miami, FL].
Answer & Affirmative Defenses to Amended Complaint, Counterclaims by Ds Radiant Telecom, Inc., et al. [Case No. 04-CV-22140 / Served Dec. 1, 2004 / Miami, FL].
Plaintiff's Answer and Affirmative Defenses to Defendants' Counterclaims [Case No. 04-CV-22140 / Dec. 28, 2004 / Miami, FL].
Defendant lprepay's First Motion for Leave to Amend its Answer, Aff. Defenses & Counterclaims; Incorporated Memo. of Law [Case No. 04-CV-22140 / Filed Apr. 4, 2005 / Miami, FL].
Answer and Affirmative Defenses to Amended Complaint, and Amended Counterclaims by Defendant lprepay, Inc. [Case No. 04-CV-22140 / Filed Apr. 4, 2005 / Miami, FL].
P's Opposition to Defendant lprepay's First Motion for Leave to Amend its Answer, Affirmative Defenses & Counterclaims [Case No. 04-CV-22140 / Filed Apr. 21, 2005 / Miami, FL].
Defendant lprepay's Reply to P's Opposition to 1st Motion . . . to Amend its Answer, Affirmative Defenses & Counterclaims [Case No. 04-CV-22140 / Filed May 4, 2005 / Miami, FL].
Counterclaim Defendants' Answer and Affirmative Defenses to Defendant lprepay, Inc.'s Amended Counterclaims [Case No. 04-CV-22140 / Filed May 31, 2005 / Miami, FL].
Answer and Affirmative Defenses of Defendant Johnny Rodriguez [Case No. 04-CV-22140 / Filed Jun. 27, 2005 / Miami, FL].
Plaintiff's Opening Markman Brief [Case No. 04-CV-22140 / Filed Jul. 14, 2005 / Miami, FL].
Second Amended Complaint [Case No. 04-CV-22140 / Served Jul. 25, 2005 / Miami, FL].
Ds' . . . Brief in Support of Ds' Markman Claim Construction [Case No. 04-CV-22140 / Filed Aug. 3, 2005 / Miami, FL].
Declaration of Richard Eskew in Support of Defendants Brief in Support of Defendants' Markman Claim Construction [Case No. 04-CV-22140 / Filed Aug. 3, 2005 / Miami, FL].
Third Amended Complaint [Case No. 04-CV-22140 / Filed Aug. 19, 2005 / Miami, FL].
Plaintiff's Reply Memorandum in Support of its Motion for a 30-Day Extension of Time To Disclose a Technical Expert [Case No. 04-CV-22140 / Filed Aug. 29, 2005 / Miami, FL].
Defendant Rodriguez's Notice of Joining Defendants . . . Brief in Support of Defendants' Markman Claim Construction [Case No. 04-CV-22140 / Entered Aug. 31, 2005 / Miami, FL].
Plaintiff's Motion for Consolidation of this Action With Civil Action No. 05-CV-22411 [Case No. 04-CV-22140 / Filed Sep. 12, 2005 / Miami, FL].

Joint Markman Hearing Memorandum [Case No. 04-CV-22140 / Filed Oct. 3, 2005 / Miami, FL].

Order Granting Plaintiff's Motion to Consolidate . . . and Instructing Clerk of Court to Consolidate Action [Case No. 04-CV-22140 / Filed Oct. 7, 2005 / Miami, FL].

Answer and Affirmative Defenses to Complaint, Counterclaims by Defendants . . . [Case No. 04-CV-22140 / Filed Oct. 12, 2005 / Miami, FL].

Markman Hearing Transcript [Case No. 04-CV-22140 / Filed Oct. 14, 2005 / Miami, FL].

Parties' Stipulation of Claim Construction of Certain Terms of U.S. Patent No. 6,651,885 [Case No. 04-CV-22140 / Entered Oct. 19, 2005 / Miami, FL].

Supplemental Claim Construction Brief [Case No. 04-CV-22140 / Filed Oct. 20, 2005 / Miami, FL].

Plaintiff's Supplemental Markman Brief [Case No. 04-CV-22140 / Filed Oct. 20, 2005 / Miami, FL].

Claim Chart Comparison [Case No. 04-CV-22140 / Filed Oct. 21, 2005 / Miami, FL].

Plaintiff's Notice of Filing Amended Joint Claim Construction Statement . . . [Case No. 04-CV-22140 / Filed Nov. 9, 2005 / Miami, FL].

Markman Hearing (Continued) Transcript [Case No. 04-CV-22140 / Filed Nov. 15, 2005 / Miami, FL].

Fourth Amended Complaint [Case No. 04-CV-22140 / Served Dec. 16, 2005 / Miami, FL].

Counterclaim Defendant Michael Acton's Answer and Affirmative Defenses to Defendant's Counterclaims [Case No. 04-CV-22140 / Filed Dec. 28, 2005 / Miami, FL].

Counterclaim Defendant Luis Arias' Answer and Affirmative Defenses to Defendant's Counterclaims [Case No. 04-CV-22140 / Filed Dec. 28, 2005 / Miami, FL].

Answer, Affirmative Defenses, and Counterclaims by Ds and Third-Party Complaint by Third-Party Ps [Case No. 04-CV-22140 / Filed Jan. 5, 2006 / Miami, FL].

Answer and Affirmative Defenses by Counterclaim Defendant Exigent & Third Party Ds Blackstone Entities, Arias and Acton [Case No. 04-CV-22140 / Filed Jan. 31, 2006 / Miami, FL].

Defendants' Statement Regarding Draft Claim Construction [Case No. 04-CV-22140 / Filed Feb. 3, 2006 / Miami, FL].

Plaintiff's Response to the Court's Draft Claim Construction [Case No. 04-CV-22140 / Filed Feb. 3, 2006 / Miami, FL].

Defendants' Supplemental Statement Regarding Draft Claim Construction [Case No. 04-CV-22140 / Filed Feb. 22, 2006 / Miami, FL].

Plaintiff's Response to Defendants' Statement Regarding Draft Claim Construction [Case No. 04-CV-22140 / Served Feb. 22, 2006 / Miami, FL].

Defendants' Response to Plaintiff's Motion to Strike the Supplemental Expert Report of Jose Fortes [Case No. 04-CV-22140 / Filed Mar. 6, 2006 / Miami, FL].

Claims Construction Order [Case No. 04-CV-22140 / Filed Mar. 15, 2006 / Miami, FL].

Plaintiff's Reply in Support of its Motion to Strike the Supplemental Expert Report of Jose Fortes [Case No. 04-CV-22140 / Filed Mar. 16, 2006 / Miami, FL].

Ds' Notice of Filing Copy of Request for Rexamination of the '885 Patent Filed with the U.S. PTO [Case No. 04-CV-22140 / Filed Mar. 23, 2006 / Miami, FL].

Ds' Motion for Recon. of the Ct's Claim Construction Order in View of Fed.Cir. Decision & Motion for Clarification [Case No. 04-CV-22140 / Filed Mar. 27, 2006 / Miami, FL].

Defendants' Motion to Exclude Expert Testimony of John Cosgrove [Case No. 04-CV-22140 / Filed Mar. 27, 2006 / Miami, FL].

Plaintiff's Motion to Preclude the Expert Testimony and Reports of Dr. Jose Fortes [Case No. 04-CV-22140 / Filed Mar. 27, 2006 / Miami, FL].

D Radiant's Motion for Sum. Judgment of Invalidity (§102—Prior Art Printed Publications) & Incorporated Memo of Law [Case No. 04-CV-22140 / Filed Apr. 6, 2006 / Miami, FL].

Ds Netel's Motion for Summary Judgment of Unenforceability and Non-infringement and Incorporated Memorandum of Law [Case No. 04-CV-22140 / Filed Apr. 6, 2006 / Miami, FL].

Defendant Iprepay, Inc.'s Motion for Summary Judgment of Non-infringement and Incorporated Memorandum of Law [Case No. 04-CV-22140 / Filed Apr. 6, 2006 / Miami, FL].

D Ntera's Motion for Summary Judgment of Invalidity (§102 –Prior Art Commercial Systems) & Incorporated Memo of Law [Case No. 04-CV-22140 / Filed Apr. 6, 2006 / Miami, FL].

Ds Intelligent's & Ntera's Motion for Summary Judgment of Non-Infringement & Incorporated Memorandum of Law [Case No. 04-CV-22140 / Filed Apr. 6, 2006 / Miami, FL].

Ds Numind's Motion for Summary Judgment of Non-Infringement & Invalidity (§112) & Incorporated Memorandum of Law [Case No. 04-CV-22140 / Filed Apr. 6, 2006 / Miami, FL].

Ps' Motion & Memorandum in Support Thereof for Summary Judgment on Infringement, Invalidity & Unenforceability [Case No. 04-CV-22140 / Filed Apr. 7, 2006 / Miami, FL].

Notice of Filing [Case No. 04-CV-22140 / Filed Apr. 7, 2006 / Miami, FL].

Counterclaim Ds' Motion & Memo of Law in Support for Sum. Judg'mt on the Counterclaims [Case No. 04-CV-22140 / Filed Apr. 7, 2006 / Miami, FL].

P's Motion to Strike & Opposition to Ds' Motion for Recon. & Clarification of the Ct's Claim Construction Order [Case No. 04-CV-22140 / Filed Apr. 11, 2006 / Miami, FL].

Defendants' Opposition to Preclude the Expert Testimony and Reports of Dr. Jose Fortes [Case No. 04-CV-22140 / Filed Apr. 13, 2006 / Miami, FL].

Plaintiff's Opposition to Defendants' Motion to Exclude Expert Testimony of John Cosgrove [Case No. 04-CV-22140 / Filed Apr. 13, 2006 / Miami, FL].

Plaintiff's Opposition to Defendants' Motion to Exclude Expert Testimony of Martin M. Zoltick [Case No. 04-CV-22140 / Filed Apr. 13, 2006 / Miami, FL].

Notice of Filing [Case No. 04-CV-22140 / Filed Apr. 13, 2006 / Miami, FL].

Ds' Opposition to P's Motion & Memo in Support Thereof for Sum. Judg'nt of Infringement, Invalidity & Unenforceability [Case No. 04-CV-22140 / Filed Apr. 21, 2006 / Miami, FL].

Iprepay's Opposition to Counterclaim Defendants' Motion for Summary Judgment on Counterclaims [Case No. 04-CV-22140 / Filed Apr. 21, 2006 / Miami, FL].

Ds' Opp. to P's Motion to Strike & Reply to P's Opp. to Motion for Recon. & Clarification of Ct's Claim Construct Order [Case No. 04-CV-22140 / Filed Apr. 21, 2006 / Miami, FL].

Plaintiff's Opposition to Defendants, ISS, LLC and Ntera, Inc.'s Motion for Summary Judgment [Case No. 04-CV-22140 / Filed Apr. 21, 2006 / Miami, FL].

Plaintiff's Opposition to Netel, Inc.'s Motion for Summary Judgment on Unenforceability and Non-Infringement [Case No. 04-CV-22140 / Filed Apr. 21, 2006 / Miami, FL].

Plaintiff's Opposition to Defendant, Iprepay, Inc's Motion for Summary Judgment [Case No. 04-CV-22140 / Filed Apr. 21, 2006 / Miami, FL].

Plaintiff's Reply in Support if its Motion to Preclude the Expert Testimony and Reports of Dr. Jose Fortes [Case No. 04-CV-22140 / Filed Apr. 21, 2006 / Miami, FL].

P's Opposition to Radiant's Motion for Summary Judgment of Invalidity Based Upon Anticipation Due to Prior Printed Art [Case No. 04-CV-22140 / Filed Apr. 21, 2006 / Miami, FL].

P's Opposition to Ntera's Motion Sum. Judg'mt of Invalidity Based Upon Anticipation Due to Prior Art Commercial Systems [Case No. 04-CV-22140 / Filed Apr. 21, 2006 / Miami, FL].

P's Opposition to Numind Software Systems, Inc.'s Motion for Summary Judgment on Non-Infringement and Invalidity [Case No. 04-CV-22140 / Filed Apr. 21, 2006 / Miami, FL].

Defendants' Reply to Plaintiff's Opposition to Defendants' Motion to Exclude Expert Testimony of John Cosgrove [Case No. 04-CV-22140 / Filed Apr. 24, 2006 / Miami, FL].

Defendants' Reply to Plaintiff's Opposition to Defendants' Motion to Exclude Expert Testimony of Martin M. Zoltick, Esq [Case No. 04-CV-22140 / Filed Apr. 24, 2006 / Miami, FL].

Defendants' Agreed Motion to Stay Litigation Pending Reexamination of the '885 Patent by the United States Patent Office[Case No. 04-CV-22140 / Filed Apr. 27, 2006 / Miami, FL].

Defendant Iprepay's Reply to Plaintiff's Opposition to Defendants' Motion for Summary Judgment of Non-infringement [Case No. 04-CV-22140 / Filed May 1, 2006 / Miami, FL].
Reply to Plaintiff's Opposition to Defendant Netel's Motion for Summary Judgment of Unenforceability and Non-infrigement [Case No. 04-CV-22140 / Filed May 1, 2006 / Miami, FL].
D Ntera's Reply to P's Opp. to Motion for Sum. Judg'mt of Invalidity Based Upon Anticipation Due to Prior Art Com System [Case No. 04-CV-22140 / Filed May 1, 2006 / Miami, FL].
D Radiant's Reply to P's Opposition to Motion for Sum Judgment of Invalidity Based Anticipation Due to Printed Prior Art [Case No. 04-CV-22140 / Filed May 1, 2006 / Miami, FL].
D Numind's Reply to P's Opposition to Motion for Summary Judgment on Non-Infringement & Invalidity (§112) [Case No. 04-CV-22140 / Filed May 1, 2006 / Miami, FL].
Defendants' Reply to Plaintiff's Opposition to Defendants' Motion for Summary Judgment of Non-Infringement [Case No. 04-CV-22140 / Filed May 1, 2006 / Miami, FL].
Plaintiff's Reply in Support of its Motion for Summary Judgment on Infringement [Case No. 04-CV-22140 / Filed May 1, 2006 / Miami, FL].
Counterclaim Defendants' Reply in Support of Their Motion for Summary Judgment [Case No. 04-CV-22140 / Filed May 1, 2006 / Miami, FL].
Order Staying Litigation Pending Patent Reexamination and Denying Motions for Summary Judgment Without Prejudice [Case No. 04-CV-22140 / Filed May 2, 2006 / Miami, FL].
U.S. District Court —N.D. of Georgia (Atlanta), Civil Docket for Case No. 1:04-CV-00873-RLV, *Pre Solutions, Inc. et al.* v. *Exigent USA, Inc.* (Dated Aug. 31, 2006 / Atlanta, GA).
Complaint for Declaratory Judgment [Case No. 1:04-cv-00873-RLV / Filed Mar. 30, 2004 / Atlanta, GA].
Order [Case No. 1:04-cv-00873-RLV / Filed Jul. 11, 2005 / Atlanta, GA].
U.S. District Court —N.D. of Georgia (Atlanta), Civil Docket for Case No. 1:04-cv-02693-RLV, *Exigent USA, Inc.* v. *Presolutions, Inc. et al.* (Dated Aug. 31, 2006 / Atlanta, GA).
Complaint [Case No. 1:04-cv-02693-RLV / Filed Sep. 14, 2004 / Atlanta, GA] (Note: Complaint Originally filed Feb. 20, 2004 / Case No. 04-CV-20415 / U.S. D.C. for S.D. Fla).
Defendant's Answer, Affirmative Defenses and Counterclaims to Plaintiff's Complaint [Case No. 1:04-cv-02693-RLV / Served Oct. 1, 2004 / Atlanta, Ga].
Plaintiff's Answer to Defendants' Counterclaims [Case No. 1:04-cv-02693-RLV / Filed Nov. 8, 2004 / Atlanta, GA].
Defendants' Motion for Leave to File Their Amended Answer [Case No. 1:04-cv-02693-RLV / Served May 19, 2005 / Atlanta, GA].
Defendants' Amended Answer, Affirmative Defenses and Counterclaims to Plaintiff's Complaint [Case No. 1:04-cv-02693-RLV / Filed Jun. 15, 2005 / Atlanta, GA].
Amended Complaint [Case No. 1:04-cv-02693-RLV / Filed Jul. 11, 2005 / Atlanta, GA].
Plaintiff's Answer and Affirmative Defenses to Defendants' Amended Answer, Affirmative Defenses & Counterclaims [Case No. 1:04-cv-02693-RLV / Filed Jul. 13, 2005 / Atlanta, GA].
Defendants' Answer, Affirmative Defenses and Counterclaims to Plaintiff's Amended Complaint [Case No. 1:04-cv-02693-RLV / Filed Aug. 1, 2005 / Atlanta, GA].
Plaintiff's Answer and Affirmative Defenses to Defendants' Counterclaims to Plaintiff's Amended Complaint [Case No. 1:04-cv-02693-RLV / Filed Aug. 24, 2005 / Atlanta, GA].
Joint Claim Construction Statement [Case No. 1:04-cv-02693-RLV / Filed Oct. 14, 2005 / Atlanta, GA].
Amended Joint Claim Construction Statement [Case No. 1:04-cv-02693-RLV / Filed Oct. 26, 2005 / Atlanta, GA].
[Proposed] Dismissal With Prejudice [Case No. 1:04-CV-02693-RLV / Filed Apr. 24, 2006 / Atlanta, GA].
U.S. District Court —S.D. of Florida (Miami), Civil Docket for Case No. 05-CV-22411, *Exigent Technology* v. *NuMind Software, et al.* (Dated Aug. 31, 2006 / Miami, FL ).
Complaint [Case No. 05-CV-22411 / Filed Sep. 2, 2005 / Miami, FL].
Plaintiff's Motion for Transfer and Consolidation of this Action with Civil Action No. 04-CV-22140 [Case No. 05-CV-22411 / Filed Sep. 26, 2005 / Miami, FL].
Order of Transfer [Case No. 05-CV-22411 / Filed Oct. 3, 2005 / Miami, FL].
Order Granting Plaintiffs Motion to Consolidate . . . and Instructing Clerk of Court to Consolidate Action [Case No. 05-CV-22411 / Signed Oct. 7, 2005 / Miami, FL].
U.S. Court of Appeals for the Federal Circuit, Docket No. 2005-1338, *Exigent Technology* v. *Atrana Solutions* —Case Summary (Dated Aug. 31, 2006 / Washington, D.C.).
U.S. Court of Appeals for the Federal Circuit, Docket No. 2005-1338, *Exigent Technology* v. *Atrana Solutions* —Case Details (Dated Aug. 31, 2006 / Washington, D.C.).
U.S. Court of Appeals for the Federal Circuit, Docket No. 2005-1338, *Exigent Technology* v. *Atrana Solutions*—Listing of Briefs (Dated Aug. 31, 2006 / Washington, D.C.).
Brief of Appellant (Non-Confidential) [Docket No. 2005-1338 / Date of Brief: Jun. 13, 2005 / Washington, D.C.].
Brief for Defendant-Appellee (Non-Confidential) [Docket No. 2005-1338 / Dated Jul. 25, 2005 / Washington, D.C.].
Reply Brief of Appellant (Non-Confidential) [Docket No. 2005-1338 / Date of Brief: Aug. 12, 2005 / Washington, D.C.].
Decision [Docket No. 2005-1338 / Decided: Mar. 22, 2006 / Washington, D.C.].
U.S. Appl. No. 09/588,917; Notice of Allowance and Fee(s) Due; Dec. 11, 2001.
European Patent Application No. 01946160.7-2221; Official Communication; Feb. 16, 2004.
European Patent Application No. 03008798.5-1238; Official Communication; Sep. 27, 2004.
European Patent Application No. 03008798.5-1238; Official Communication; Oct. 9, 2003.
U.S. Appl. No. 09/642,600; Notice of References Cited; Mar. 26, 2003.
U.S. Appl. No. 09/578,356; Notice of References Cited; Jun. 6, 2001.
U.S. Appl. No. 09/578,356; Notice of References Cited; Apr. 18, 2002.

* cited by examiner

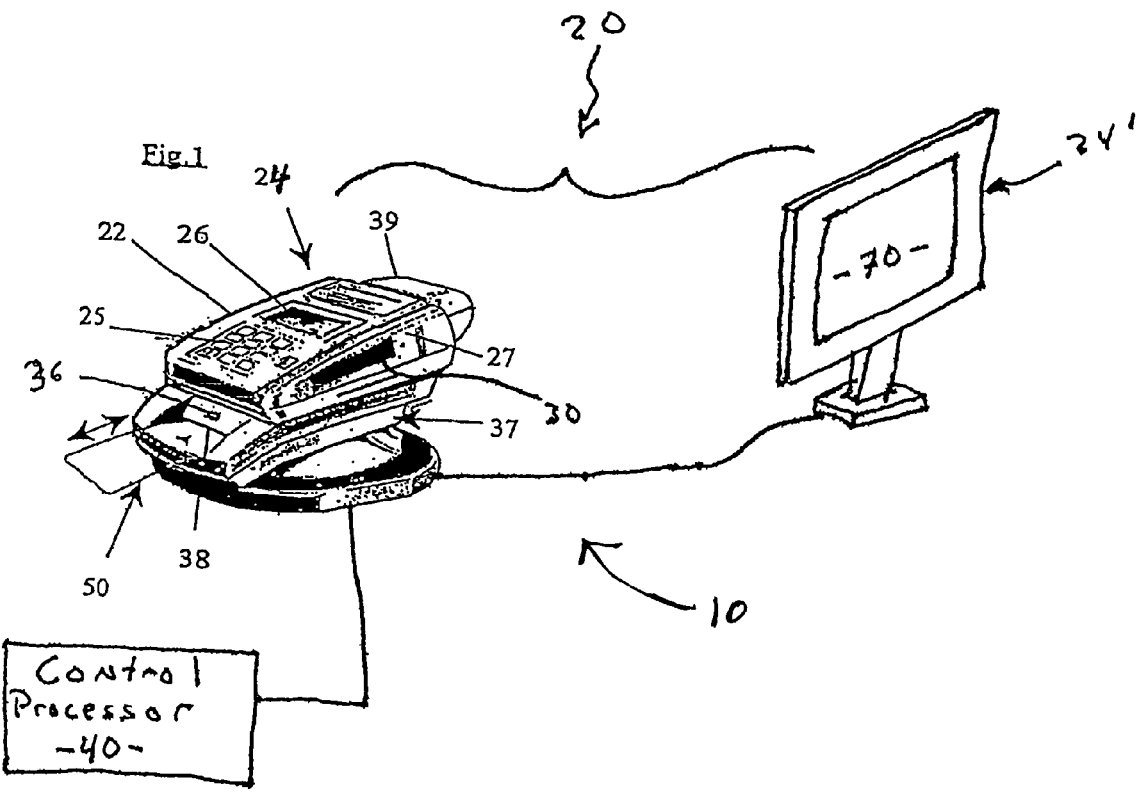
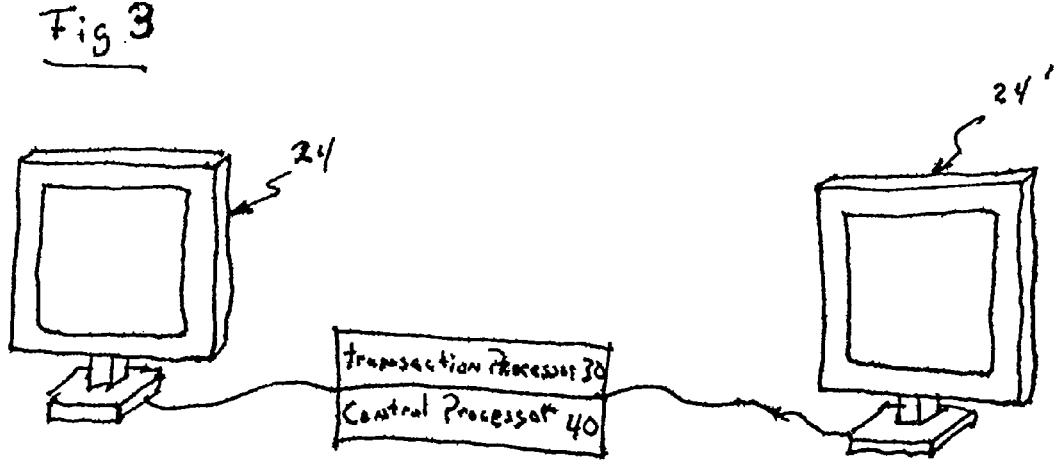

MULTI-FUNCTION TRANSACTION PROCESSING SYSTEM

CLAIM OF PRIORITY

The present application is a continuation-in-part application of previously filed, now pending application having Ser. No. 10/637,799 filed on Aug. 8, 2003, which is a continuation-in-part application of previously filed, now pending application having Ser. No. 10/120,896 filed on Apr. 11, 2002, now U.S. Pat. No. 7,181,416 which is a continuation-in-part application of previously filed, now pending application having Ser. No. 09/588,917, filed on Jun. 8, 2000 now U.S. Pat. No. 6,651,885.

BACKGROUND OF THE INVENTION

1. Field of the Invention

The present invention relates to a multi-function transaction processing system which many be disposed at a commercial location in order to complete a variety of commercial transactions, including credit/debit card purchases, while also facilitating one or more alternate, commercially advantageous functions including the issuance of authorization codes for purposes related to pre-paid telephony service, Internet purchases, lottery purchases, and the like, without having to have a pre-selected inventory on hand. Moreover, the present transaction processing system is configured to be accessed my multiple users, preferably including a customer and an attendant so as to provide the customer with substantial freedom and flexibility to select and customize a desired product, such as the authorization code, while also achieving attended consummation of the transaction which increases purchase flexibility and security. Accordingly, a customer may have a very large variety of potential selections available to them in an easy to identify and substantially current manner that does not take up excessive inventory space, and does not require the merchant to choose between more or less popular selections.

Furthermore, the multi-function transaction processing system provides an effective source for the dissemination of a variety of promotional materials in connection with the transaction being completed utilizing the system and is configured to produce and issue a customized card to a particular user with minimal printer error and account losses.

2. Description of the Related Art

With the ever increasing popularity of credit or debit card payments at commercial establishments, it is becoming increasingly commonplace to find small credit card transaction terminals at commercial establishments such as grocery stores, gas stations, convenience stores, and the like. Typically, these conventional credit/debit card transaction terminals are linked to an affiliated service so as to provide for the approval of a particular transaction, thereby facilitating payment to the merchant. Such traditional transaction terminals are, however, limited to providing authorization for a particular purchase in lieu of a cash payment for products or services that are normally offered by the merchant. As a result, while they are a convenience for the operators of commercial establishments, they do not provide any added commercial advantage to the commercial establishment. Indeed, the convenience factor is generally the only factor to offset the service fees that must typically be paid by the commercial establishments to the authorizing entity. As a result, it would be beneficial to provide an enhanced transaction terminal as part of a transaction system, which in addition to facilitating traditional credit/debit card purchases, will also provide an added source of economic benefit for the commercial establishments employing such a system, directly as a result of its use.

An example of an added source of revenue that has become increasingly popular for merchants includes the calling card industry, wherein a particular commercial advantage is being attained from the sale of pre-paid calling cards. Specifically, such pre-paid calling cards are typically supplied in bulk to a retail establishment where they may be sold at specific monetary denominations. In essence, each pre-paid, pre-printed calling card provides a purchasing consumer with the appropriate access to a defined amount of telephony connection time. As a result, the consumer, often at a reduced rate, is able to initiate any desired telephony communication from any telephone, without incurring toll or other service charges in connection with that telephone.

Despite advances in the calling card industry, it is often commercially limiting to provide the physical cards to the commercial or retail establishments for appropriate sale to the consumers. For example, if sales are slow at a particular location, an inventory of cards will remain unused and unsold. The fact that a finite amount of air time is purchased by the operators of the card requires that the time remain un-used in case a purchase does indeed occur with regard to a pre-printed account. Conversely, an establishment which makes a large volume of sales may run out of cards and future potential sales will be lost as no cards are available. Yet another inconvenience associated with traditional pre-printed calling card relates to the need for inventory space to store large volumes of physical cards, naturally resulting in added expense, and the fact that the cards, once printed, cannot be changed if retail identity, rates, etc., change, and provide an actual commodity susceptible to theft or other misappropriation.

Furthermore, it is also recognized that with increased globalization and competition in the market, there are a substantial number of alternative products that are now available to consumers. For example, in the pre-paid calling card industry, there are a variety of plans available based upon a number of factors including typical duration of call, call destination, call origination location, etc. As such, a plan that is most desirable to a consumer who makes a majority of there calls to one location may not be the most desirable to a consumer that places calls to many different locations. Accordingly, utilizing conventional systems a user has limited choices and truly cannot explore, take advantage of, or identify the best option from a large sampling. It is also noted that despite the desirability to have an attended transaction processing system in many instances, an attendant often does not have sufficient time or knowledge to assist a consumer by explaining or presenting to them a variety of options.

It is recognized that others in the art have sought to develop individual card printing devices. Specifically, such devices are generally standard printing devices that print a particular calling card on demand, thereby minimizing the space and inventory requirements of the commercial establishments and permitting at least a degree of variability, such as in connection with card denominations. Unfortunately, however, such systems are still severely limited, as each card printing terminal is provided with a finite number of plans and access codes to be printed on a finite number of calling cards. Typically, a quantity of the access codes are downloaded into the individual terminal at a predetermined period of time, in much the same manner that traditional cards are stocked at the establishment. As a result, the information and the plans cannot be readily updated and these existing devices do not alleviate the problems associated with outstanding, unsold access codes/pin numbers, or the loss of sales after depletion of an initially defined volume of cards. Furthermore, such terminals are merely printers which print a number of cards, and they do not provide any further business enhancing qualities or functions which provide a commercial advantage to the establishment utilizing the terminal, beyond merely the sale of a small selection of calling card. Moreover, it is also recognized that whenever an attempt to customize the appearance of a particular card is made, significant losses to misprints and the like can occur. For example, if a card stock is provided with indicia on one face and a printable surface on an opposite face, improper introduction of a stock card into the printer will result in either an illegible print and/or the failure of a thermal type printer to print anything on the card. Still, however, under such circumstances the authorization code has been generated and issued, and the printing of a new card results in the issuance of a new authorization number. In such a situation, even if the transaction is voided, the authorization number is used and remains 'open' in the control system. Naturally such can be very costly and inconvenient to service providers as they often deal with finite number blocks of authorization numbers and it is not practical to have a large number of outstanding numbers which the service provider cannot distinguish between actually purchased, but yet unused cards versus misprints.

Accordingly, there is still a need in the art for a calling card system which does not have to be limited in terms of quantities sold, allows for complete card versatility, and ensures that proper utilization of all resources is maintained without waste, improper printing or storage problems. Additionally, such a transaction system should provide enhanced functionality so as to provide a variety of commercially advantageous services/products for a particular establishment, providing consumer incentive for the calling card purchases and to providing a mechanism via which the costs associated with the calling card to the retail or distributor can be offset through the association of alternative commercial endeavors, such as promotions and other services. Also, such a transaction system should be easy and convenient to interact with by a consumer, providing the consumer with updated information and a large number of selections and information, while still providing for attendant control and coordination of certain vital features such as payment processing and actual card issuance, if desired.

The present invention also recognizes that given the advances of global computerized network communications and commerce, increased purchase avenues are continuously being made available to consumers. Unfortunately, however, many traditional consumers still have security concerns associated with consummating such electronic transactions, especially if they will be required to transmit credits/debit card information to the merchant. In some circumstances, privacy concerns also restrict a consumer's desire to make certain purchases by traditional means. As a result, it would be beneficial to provide a transaction system which is capable of offering prepaid services which can not only be utilized for such traditional services as telephony communication, but which also provides a means through which a consumer can establish a prepaid purchase, utilizing that pre-payment for any of a variety of products or services.

SUMMARY OF THE INVENTION

The present invention is directed to a multi-function transaction processing system. The transaction processing system includes a transaction terminal that may be disposed at any establishment, including a commercial or retail type establishment. In particular, the transaction terminal includes at least two data entry facilities and a transaction processor associated therewith. Moreover, the transaction processor, which facilitates a variety of the operational functions of the transaction terminal, is communicatively associated with a control processor.

The first data entry facility associated with the transaction terminal includes a payment authority input which accepts a payment authority, such as a credit card transaction or acknowledgment of cash payment. In this regard, the first data entry facility is preferably disposed to be utilized by an attendant at a particular location. As for the second data entry facility, it is preferably a customer data entry facility that includes a display operatively associated therewith, as well as a customer interface structured to be accessed by a customer. Preferably one or more of the customer data entry facility are also operatively associated with the transaction terminal. In this regard, the transaction processor is structured to be responsive to customer inputs made via the customer interface, and thereby provides the customer with a plurality of selections on the display. Furthermore, the display is preferably visible and accessible in customer accessible locations so as to serve as an effective and attractive promotional display.

Communicatively associated with the transaction processor is a control processor. The control processor is structured to define a user account in accordance with a user selection, and to issue an authorization code associated with the user account. Preferably the user account includes a defined value that is at least partially defined by the payment authority. As a result, the authorization code facilitates a subsequent transaction in accordance with that defined value, while the control processor provides necessary confirmations or validations.

The transaction processing system of the present invention may also include a printer assembly. The printer assembly is communicatively associated with the transaction terminal and is structured to at least generate a card assembly. In the illustrated embodiment, the card assembly may be generally elongate, including one or more portions, as well as a first face and a second face. For example, a first portion of the card assembly many include at least the authorization code thereon, while a second portion of the card assembly many include promotional materials thereon. As such, when a consumer completes an appropriate transaction where an authorization code is required for a particular future transaction, the consumer will be provided with the card assembly to facilitate their maintenance and/or conveyance of the authorization code. Conversely, the second portion may include promotional materials which can be distributed to the consumer and provides an incentive for consumer purchase and/or advertisement and promotion for a merchant. Also, it may be preferred that all of the information, including the authorization code and any promotional materials be printed on one of the two faces of the card assembly, thus allowing for single sided printing. Moreover, such an embodiment permits the card assemblies to be pre-printed with a logo or other indicia affiliated with an issuing or redemption merchant or service provider on the opposite face.

In order to prevent the waste of authorization codes that may result form the improper printing of a card assembly, the card assemblies also preferably include an indicator which is structured to provide an identifiable indication to the printer as to whether the card assembly is properly oriented relative thereto. As such, if the card assembly is not properly oriented and will not print properly, the indicator will prevent the printer assembly from completing the printing and may signal an alert to a user that the card should be re-oriented.

These and other features of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which:

FIG. 1 is a perspective illustration of an embodiment of the transaction terminal and printer assembly associated with the system of the present invention;

FIG. 3 is a perspective illustration of another embodiment of the multi-function transaction processing system of the present invention;

Like reference numerals refer to like parts throughout the several views of the drawings.

DETAILED DESCRIPTION OF THE PREFERRED EMBODIMENT

Figure 2:
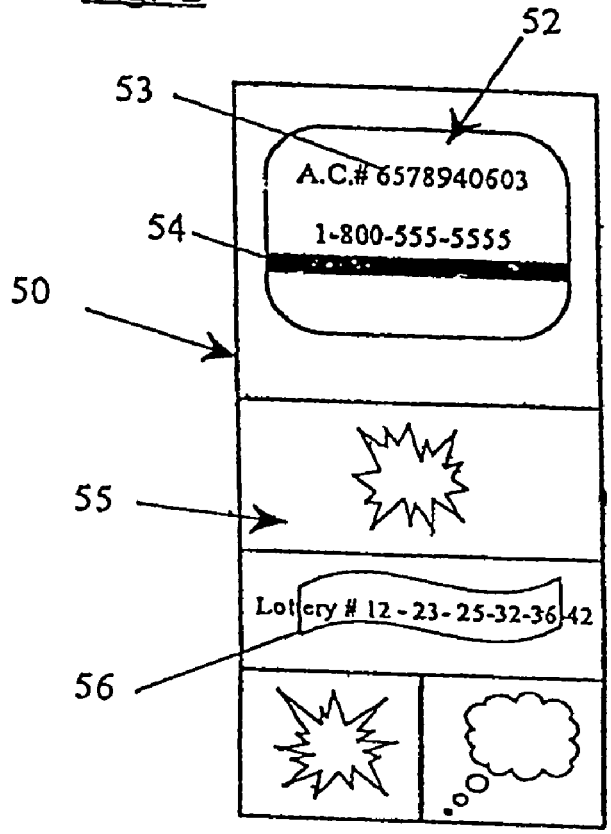
FIG. 2 is an illustration of the card assembly of an embodiment of the present invention.

As illustrated in the figures, the present invention is directed to a multi-function transaction processing system, generally indicated as 10. The transaction processing system 10 is structured to coordinate and facilitate a variety of different transactions in an efficient and integrated manner which provides an increased commercial benefit beyond what is normally available to a merchant utilizing the transaction processing system 10.

Looking to an embodiment of the transaction processing system 10, as illustrated in the figures, the transaction processing system 10 includes at least one transaction terminal 20. The transaction terminal 20 can be generally compact and convenient to position within a facility, such as secured directly to a checkout counter or similar location. In this regard, it is recognized that the transaction terminal 20 is preferably configured and positioned so as to permit its use directly or interactively by a consumer/customer, while also allowing for convenient and effective use by an authorized attendant, such as the merchant, to complete the desired transactions, or the user may be exclusively the merchant.

The transaction terminal 20 includes at least two data entry facilities 24, 24' and a transaction processor 30. The first and second data entry facilities 24, 24' may include one or more of a variety of conventional input facilities, including a keypad 25 which may be separate or integrated as part of a touch screen, a magnetic stripe reader 27 through which a credit or debit card many be passed, and/or any other data entry facility such as a bar code scanner or other scanning device. Looking to the illustrated embodiments, the first data entry facility 24 preferably includes a small terminal type station structured to be easily accessed and actuated by an attendant. In this regard, it is noted that the first data entry facility may be in an isolated location, such as behind a counter or partition, or may be disposed so as to ultimately be accessible to the consumer as well for certain aspects of the transaction. For example as will be described subsequently, the first data entry facility 24 may include a signature capture structure and/or keypad for the entry of a security number to facilitate payment. Of course, these interactive security entry items may be provided in connection with the second data entry facility 24' as well or instead of on the first.

Looking to the preferred second data entry facility 24', it is preferably a customer data entry facility 24' that can include a customer interface and at least one display operatively associated therewith. Although it is recognized that the customer data entry facility 24' may be much the same as the illustrated first data entry facility 24, in the illustrated embodiment, and/or provide for independent completion of a transaction, as in the embodiment of FIG. 3, the customer data entry facility 24' preferably provides for greater ease of use and interactivity than the first data entry facility 24. As such, the customer data entry facility 24' may include a larger touch screen type configuration capable of providing the customer with large amounts of information and selections, and achieve a very easy and intuitive selections process by the consumer. As such, a screen 70 is preferably positioned to define both the display and the customer interface, and so as to provide an attractive display to promote the products being offered and/or attract customer interaction and purchase. Moreover, the customer data entry facility 24' is preferably oriented towards a different direction than the first data entry facility. For example, in the illustrated embodiment the first data entry facility 24 is positioned to be more easily accessed by an attendant, whereas the second, customer data entry facility 24' is positioned to be more easily accessed by the customer. This differing positioning also allows the customer data entry facility 24' to be positioned at a more remote or convenient location that is out of the way of the attendant's work area, such as a check out counter, and/or has higher traffic to draw attention to more consumers. A customer can therefore take their time making necessary selections and need not block the main counter area or other area of a merchant facility, thus allowing the attendant to take care of other customers while the customer seeking to purchase an article in connection with the present transaction terminal 20 can take their time. Indeed, it is preferred that the transaction processor 30 be structured to provide a user with a plurality of selections.

Figure 6:
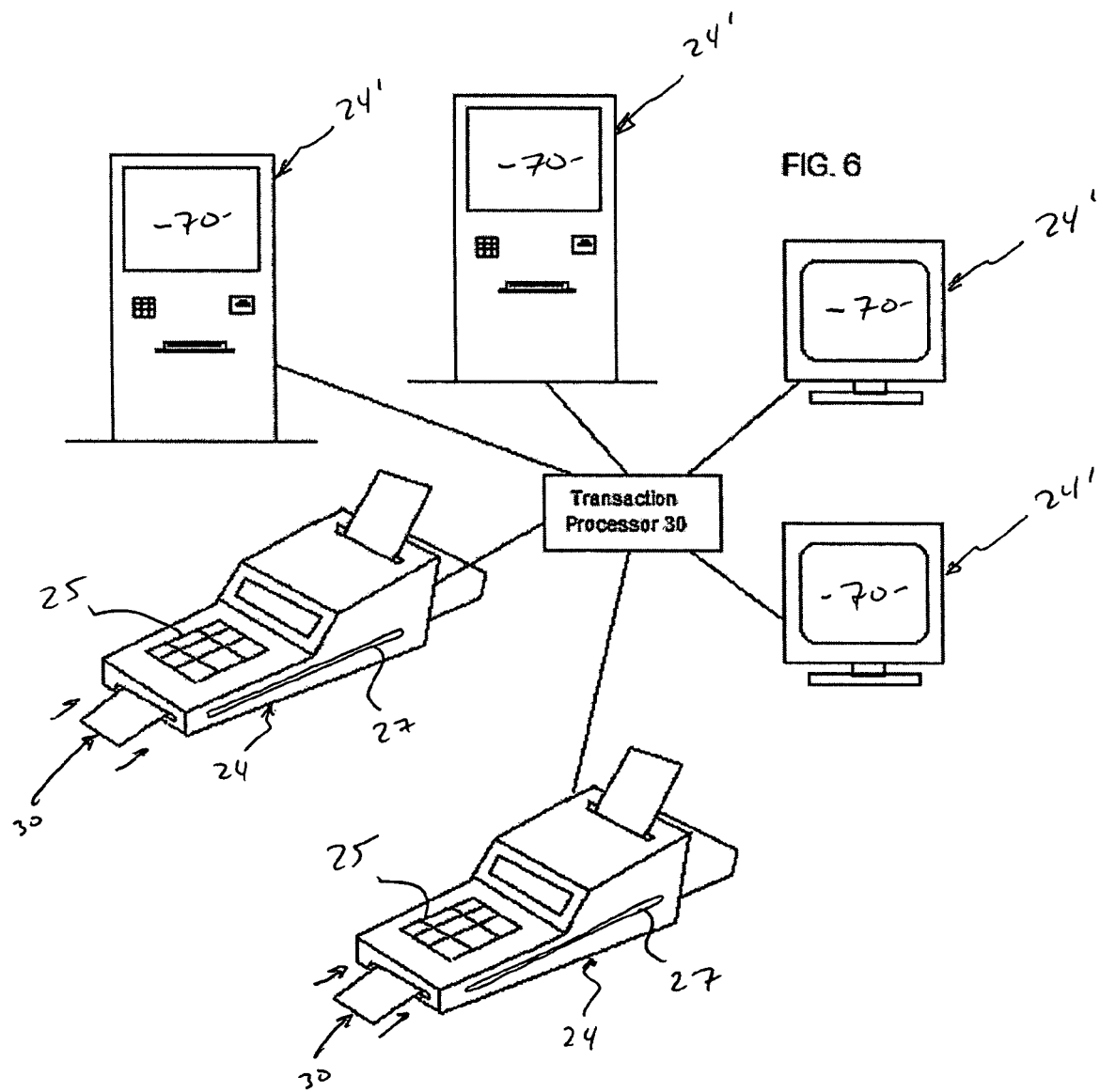
FIG. 6 is an illustration of another embodiment of the transaction processing system of the present invention including a plurality of customer data entry facilities.

Further, looking to the embodiment of FIG. 6 it may be preferred that a plurality of the customer data entry facilities 24', of the same or different configurations, be provided within a specific locale. As such, a greater promotion of the products thereby can be achieved, and a large number of customers can be served. Under such an embodiment, the individual customer data entry facilities 24' can completely consummate a transaction by allowing for the user selection, accepting a payment authority, such as using a credit/debit card reader and/or cash acceptor, and issuing a card assembly, or can merely provide for a user selection requiring ultimate issuance of the card assembly at the first data entry facility 24, to a number of customers simultaneously. Also, within a larger merchant facility having a number of "check out" type stations, one or more customers may use the one or more second, customer data entry facilities 24' to make selections, and thereafter complete the transaction at any of a plurality of first data entry facilities 24. In such an embodiment, an identifier of each customer's selection should be provided, either by the system or the customer for appropriate correlation at the first data entry facility 24 to identify the correct selection for that customer.

In particular, in a preferred embodiment of the present invention, the customer will utilize the present system 10 to purchase pre-paid calling cards, whether for conventional or wireless/cellular telephone use. As such, the transaction processor will preferably provide the user with a large number of choices via the second data entry facility 24' in order to allow the user to truly choose a card that suits them best. For example, often some cards have better or different rates than others to certain locations, and as such, a more generic card may not be optimal for the customer, or a customer uses a certain type of wireless/cellular plan that allows for pre-paid purchases of air time. Alternatively, it is also recognized that the present system may be utilized to purchase a variety of other pre-paid products such as product or service gift cards and the like for redemption with either the issuing merchant or another affiliated or unaffiliated merchant. By having information regarding a plurality of selections available, and waiting, as will be described to print an actual card in response to customer selections, a much larger stock and selection pool of products and product denominations can be provided. Furthermore, it may be desirable that said transaction processor make a number of inquiries of the customer via the customer data entry facility 24' so as to ultimately guide and/or aide the user's selection process, and minimize confusion and/or delay to the customer based upon the large number of selections.

Figure 5:
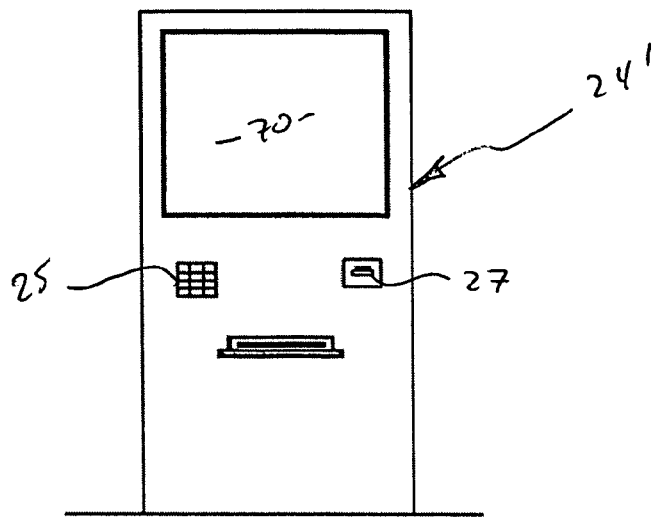
FIG. 5 is an illustrated embodiment of another embodiment of the customer data entry facility.

Preferably, but not necessarily included as part of one or more aspects of the first data entry facility 24, and in some embodiments all or partially as part of the one or more second, customer data entry facility 24' is a payment authority input by which a payment authority may be received and/or communicated to the transaction processor 30. As such, any of the previously mentioned types of the data entry facilities 24, 24' may qualify as the payment authority input, although in the illustrated embodiment of FIG. 1 the payment authority input includes the keypad 25 and the magnetic stripe reader 27 associated with the first data entry facility 24 or in certain embodiments of the second data entry facility 24' as shown in FIG. 5, including is included as part of the touch screen 70. Additionally, in the illustrated embodiment of FIG. 1, one or both of the data entry facilities 24, 24' may also include an electronic signature capture assembly, such as integrated as part of a display assembly 26 or touch screen 70. Specifically, such an electronic signature capture assembly 26 is structured to permit a consumer to make an electronic signature directly thereon, thereby avoiding the need for a carbon receipt to be signed by the consumer, and eliminating the need for a merchant to maintain paper receipts of purchases.

As such, utilizing one or more of the different types of data entry facility 24, 24' configurations recited, a consumer is able to provide a desired payment authority to the transaction terminal 20, which is then communicated to the transaction processor 30. For example, if the consumer wishes to make a purchase from the merchant utilizing the transaction terminal 20, they may pay cash in a traditional fashion or may provide a credit or debit type card to the merchant. The merchant is then able to provide credit card transaction information as the payment authority, such as by inputting the appropriate credit card transaction information and/or passing an appropriate card through the magnetic stripe reader 27. In the illustrated embodiment the credit card transaction information includes at least a credit card account and a transaction amount as the payment authority. It is, however, recognized that the credit card transaction information may include additional information, such as credit card expiration date. Moreover, although for purposes of clarity and ease of explanation, reference is being made to a credit card transaction and credit card transaction information, it is understood that a check card, smart card, debit card, check or other similar account payment method may be employed in a conventional fashion, the credit card transaction information including the necessary information for processing a particular purchase, sale or transaction in accordance with the payment account selected.

In addition to receiving credit card transaction information as the payment authority, however, the illustrated embodiment of the present invention may also receive an external payment verification, at least partially as the payment authority. Specifically, and for reasons to be described subsequently, a consumer may make a cash or credit card purchase separate from the transaction terminal 20, but may wish to have a further receipt, authorization, promotional item or completion of a further transaction facilitated by the transaction terminal 20. In such an embodiment, preferably utilizing the keypad 25 as the payment authority input, although it is recognized that alternative payment authority inputs, including a direct link to a transaction computer, cash register, or more traditional credit card authorization device may also be employed, an input related to the external payment verification is provided. For example, if the consumer desires to pay cash, the payment authority can be appropriately entered into the transaction terminal 20 as the external payment verification. In such an embodiment the external payment verification indicates the nature and extent of the external payment and, if desired for security reasons, the transaction processor 30 may require an access authorization in connection with the external payment verification. As such, a validity of the external payment verification can be ensured. The access authorization may include, for example, any access code or other security verification including a key, key card, personal identifier, etc., as the access authorization, an authorized individual associated with the merchant properly providing the access authorization to indicate that the external payment verification is indeed valid and is backed by the external transaction.

The transaction processing system 10 of the present invention also includes a control processor 40. The control processor 40 is communicatively associated with the transaction processor 30 of the transactional terminal 20, and may be integrally defined as part thereof subject only to updating as needed, especially if credit card purchases will be separately verified, or may be defined as a separate and often remote structure as in the illustrated embodiment of FIG. 1. In this embodiment, it is recognized that one or more control processors 40 may be provided and locally or remotely communicatively associated with one or a plurality of transaction processors 30, a large network of transaction terminals 20 being contemplated. Moreover, the communication that is established between the transaction processor 30 and the control processor 40 is preferably two way, and may be achieved through any of a variety of structures, including a dedicated connection, a network type connection, a wireless connection, an Internet connection and the like, so long as at least some degree of preferably secure data transmitting communication may be achieved. Along these lines, the transaction processor 30 is structured to communicate the payment authorities received at the transaction terminal 20 to the control processor 40. Moreover, in some instances, such as with a conventional credit card transaction, the control processor 40 is structured to validate and/or authorize the payment authority, such as by verifying the credit card account information or ensuring that the access authorization associated with an external payment verification is valid.

The control processor 40 is also structured to define a user account and to issue an authorization code associated with the user account, such as for the benefit of a consumer in connection with a further transaction, to be described. Generally, the authorization code and user account are defined by the control processor 40, at least partially in response to the payment authority received at the transaction terminal 20. Furthermore, the user account defined by the control processor 40 may include a defined value, such as a dollar value or transaction quantity/frequency value, which is also at least partially defined by the payment authority. As a result, the authorization code issued by the control processor 40 is structured to facilitate a transaction in accordance with the predefined value of the user account for which the authorization code was issued. Additionally, the authorization code and customer account defined by the control processor 40 may be the same as one another and are also preferably defined in response to the user selections that were made utilizing the first or the customer data entry facilities 24 24'. In this regard, the customer may make an actual selection using the customer data entry facility 24', that selection being communicated to the transaction processor 30 and ultimately the control processor 40, or the customer may be given a code to be presented to the attendant that corresponds a desired selection. For example, in one embodiment the customer reviews the various selections and then makes a selection using the customer interface. The selection made by the customer can then be immediately communicated to the transaction processor or can be placed in a cue, and possibly assigned a cue number, such as if an attendant is handling other transactions using the first data entry facility 24 or if the customer makes there selection but then must wait in line for the attendant. Then preferably pending entry of a satisfactory payment authority, either by the attendant at the first data entry facility 24 or the customer at either the first or second, customer data entry facilities 24, 24' the purchase can be processed and the customer account defined by the control processor 40. It is with reference to such a transaction that one can illustrate an integral control processor 40 wherein a batch or store of user accounts and/or authorization codes can be pre-stored in a local control processor, and then issued from that defined, and preferably periodically updated cache. Still, however, it is preferred that all or part of the control processor 30 be remote such that the most up to date information can be provided to the customer as their selection options, and such that certain codes are not held out of use.

Figure 4:
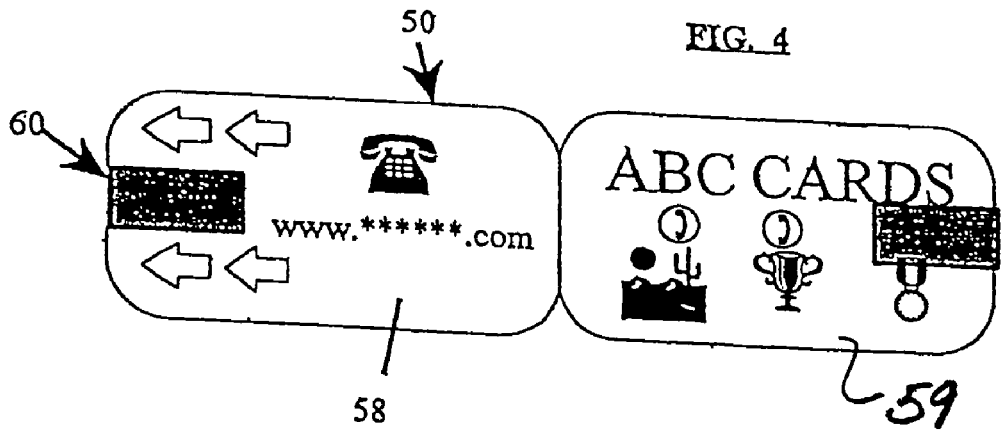
FIG. 4 is an illustration of one embodiment of the card assembly including the indicator thereon.

Under any such embodiment, it is preferred that the control processor 40 communicates the authorization code to the transaction terminal 20 for communication to the consumer, if necessary and/or as necessary. In particular, although the authorization code defined by the control processor 40 may be communicated to a consumer in a variety of fashions, such as merely by illustrating it on the display assembly 26 of the transactional terminal 20, in the illustrated embodiment, the multi-function transaction processing system 10 also includes a printer assembly 37 through which at least a printout of the authorization code may be provided for the consumer. Specifically, the printer assembly 37 may be communicatively associated with the first or customer data entry facility 24, 24' or any other portion of the transaction terminal 20, but is preferably structured to be under the control of an attendant. In the illustrated embodiment, the printer assembly 37 is structured to generate a card assembly 50. The card assembly 50, which may be constructed of a generally thick card stock type material, may also be generally elongate, as illustrated in FIGS. 2 and 4, so as to define a greater amount of information receiving surface area. Of course, however, it is recognized that although physical printing of the authorization code 53 on the card assembly 50 is to be described in connection with the illustrated printer assembly 37, other types of printed encoding, such as the making of encoded markings or the appropriate encoding of a magnetic stripe 54, or other data storage structure on the card assembly 50 may also be utilized and are considered within the scope of the present description of printing. In the illustrated embodiment, the card assembly 50 includes at least a first portion 52 and a second portion 55. The first portion 52 includes the authorization code 53 thereon, such as in the form of printing of the authorization code directly on the first portion 52. Additionally, in the case of a telephony communication transaction, as will be described, a telephony access number may also be disposed on the first portion 52 of the card assembly, the telephony access number to be utilized to initiate the telephony communication with a telephony server. Furthermore, so as to facilitate usage of the first portion 52 of the card assembly 50 in a manner similar to conventional prepaid calling cards, the first portion 52 may be detachable from the second portion 55 or folded atop the second portion 55, thereby permitting the first portion 52 to be substantially compact such as in the form of a credit card or similar sized structure, or in the form of a smaller structure such as may be hung from a key chain. Also, as seen in FIG. 2, one or more aspects of the card assembly 50 may be provided on a magnetic stripe 54 or other encoded structure in addition to or instead of direct printing on the surface of the card assembly 50.

Looking to the second portion 55 of the card assembly 50, if included, among other items, it preferably includes promotional materials disposed or depicted thereon. Specifically, the promotional materials may include coupons, advertisements and/or a variety of other promotional articles which may be attractive to a consumer, or which a merchant may wish to promote to consumers obtaining an authorization code for a desired transaction. As such, the merchant, distributor or other individuals associated with the transaction terminal 20 may, if desired, achieve an additional source of revenue through payments or offsets from the source(s) of the coupons and or advertisements depicted by the second portion 55 of the card assembly 50. This also, provides an added value to the consumer of the card assembly 50 through the additional promotional items, discounts and the like, thereby adding increased incentive to purchase such a card assembly over other competing products. Of course the added value may merely be to the issuing or redemption or a third party merchant that is promoting their brand name or logo on the first or second portions of the card, either for an added fee or as an identifier as part of the normal transaction.

Also, turning to FIG. 4, it is noted that the card assembly 50 includes a first face 58 and a second face 59. In one preferred embodiment, the first face 58 has a quantity of pre-printed materials thereon, such as an identification of the type of product being sold and/or a logo of a merchant. In this respect, a pre-designed card stock can be provided and maintained for use when a user desires to purchase a specific brand card assembly 50. In such an embodiment, the second face 59 of the card assembly is at least partially blank and/or otherwise designed so that the printer assembly 37 can print the corresponding items, such as the authorization code thereon, at a time of purchase. Such a configuration may also allow for different branding opportunities, even from the same transaction terminal 20. Still, the logo or brand identifier, a previously recited, may be printed at the time of purchase on any portion of the card assembly.

Looking in further detail to the specific embodiment of the printer assembly 37 illustrated in FIG. 1, it is preferably generally elongate, and is formed in association with a remainder of the transaction terminal 20. In this regard, the printer assembly 37 may in include an elongate, generally planar slot 38, through which the elongate, potentially stiff card assembly 50 is passed for appropriate printing thereof.

Although, it is recognized that in the case of more conventional transactions, or even in most transactions when a consumer desires to have a receipt of their transaction, the printer assembly 37 may also be utilized for that purpose, such as by printing appropriate receipt information directly on a portion of the card assembly 50 or on a separate document. In the embodiment illustrated in FIG. 1, however, a receipt printer 39 may also be provided. The receipt printer 39, which may be considered part of the overall printer assembly, is structured to print a receipt associated with an authorized transaction for the consumer and as a result need not be provided directly on the card assembly 50. In such an embodiment, the receipt printer 39 is as at least partially distinct from the printer assembly 37. As mentioned, however, and still with reference to FIG. 1, in addition to or instead of the distinct receipt printer 39, the printer assembly 37 may include the receipt printer directly as a part thereof, such as through a separate paper feed, printing directly on the card assembly 50, or requiring a conventional paper stock for the purposes of issuing a more traditional receipt before or after printing of the card assembly 50 and for completion of a desired transaction.

The printer assembly 37 may include any of a variety of different types of printers, however, a thermal type printer configured to print on specially coated and/or configured paper is preferred. Moreover, it is recognized that in some embodiments wherein the card assembly 50 includes the first face 58 with the pre-printed materials thereon and the printer assembly accomplishes one side printing, it is important to ensure that the card assembly 50 is properly introduced into the printer assembly 37 so that the printer assembly 37 will not attempt to print the important information on the pre-printed, first face 58. Indeed, in the case of a thermal printer, the printing process may actually occur, but if it is performed on the pre-printed side and/or an untreated side, no legible printing will ultimately appear and an operator is left without knowing whether a printer malfunction occurred and a specific transaction was actually completed, or whether another malfunction occurred and the transaction was not actually completed. The operator may therefore be left with little choice but to void the first transaction, and issue a new card, often thereby wasting an authorization or account number. In order to prevent such an occurrence the card assembly 50 may preferably include an indicator assembly 60 thereon. The indicator assembly, which may be disposed on the first or second faces of the card assembly 50 preferably functions in association with the printer assembly 37 so as to allow for effective determination of the orientation of the card assembly 50 by the printer assembly 37, and thus preventing printing if the card assembly 30 is not properly oriented. In the illustrated embodiment the indicator 60 is disposed on the first face 58 and includes a minimally reflective mark, such as a black or generally opaque stripe disposed on the card assembly 30.

Furthermore, the printer assembly includes a correspondingly disposed sensor 36. The sensor 36 is structured to effectively identify the indicator 60 and to thereby determine if the card is properly oriented for printing. In the preferred, illustrated embodiment, the sensor 36 is structured to emit a light beam and detect a reflection thereof. Naturally, if the light beam is directed to the indicator, minimal amounts of light, if any will reflect, and the presence of the indicator can be determined. Naturally, the sensor 36 can be configured to interact with the first and/or the second face of the card assembly 30, and it can be configured such that the detection of the indicator 60 is indicative of proper or improper orientation of the card assembly 30.

It is also noted, that by associating the printer assembly with the first data entry facility 24, the printing process is an attended process and error minimization is achieved, such as if the printer sensor is not included. Furthermore, various stocks of blank cards may also be provide, the attendant selecting an appropriate card, such as for marketing or promotional reasons, and or to correspond the specific type of customer account ultimately selected by the customer.

As indicated, the control processor 40 is structured to receive information relating at least to a payment authority from the transaction processor 30. In the case of a point of sale purchase of goods or services, the control processor 40 may only communicate an appropriate authorization to the transaction terminal to complete the point of sale purchase. In other embodiments, however, when an authorization code is desired for supporting another, typically subsequent transaction, the control processor 40 defines the user account. Along these lines, it is noted that when the control processor 40 defines a user account, a new user account may be provided in connection with each authorization code, or in some instances, an existing user account may be utilized, such as by re-filling. In either instance, however, each user account is associated with a specific type of account, such as a specific calling/card plan or redemption merchant, and includes its defined value, whether the defined value begins at zero with the formation of a new user account or is at a defined amount already. The control processor 40 then adds to that defined value or selects a defined value in accordance with an amount defined at least by an authorized payment authority received from the transaction processor in connection with that user account. For example, if payments for point of sale purchases are not involved and a consumer's sole purpose is to obtain an appropriate authorization code for a new user account, or merely to add to an existing user account, a substantial component, if not all of the payment authority will usually be the value of the user account. In this regard, it is recognized that processing fees, service fees and the like may be deducted, such that a payment authority for a certain amount will not precisely correspond to the value added to the user account. Conversely, in connection with certain promotions, the value of the user account may be increased by an amount greater than the actual payment authority, such as in connection with an incentive plan where a payment authority of a certain larger amount entitles the consumer to a greater value increase to the user account (i.e. a $20 purchase gives $25 worth of credit).

As mentioned, although a variety of different transactions may be achieved in connection with the issued authorization code, in one embodiment of the present invention the transaction that is facilitated by the authorization code includes a telephony communication. As a result, pre-paid service is established and an extent of the telephony communication(s) available is limited by the defined value and type of user account associated with the authorization code. As mentioned, in such an embodiment a telephony access number may also provided to the user, such as on the card assembly 50, and may in include a toll-free or similar access number which initiates communication with a telephony server and or activates and or associates an authorized amount of telephony usage with an established account, such as a pre-paid wireless telephony account. Whether the telephony access number and or the authorization code are merely viewed on the display assembly 26 or are provided on the card assembly 50 by the printer assembly 37, a consumer utilizes the authorization code and telephony access number in connection with an auxiliary device, such as a computer or telephone, so as to communicate with a telephony server. The telephony server in turn may communicate with the control processor 40. Specifically, the auxiliary device, such as including the telephone and/or telephony server receives the authorization code and through communication with the control processor 40 is able to identify the user account and the defined value of the user account. Accordingly, the telephony server is able to determine the extent of the telephony communication that can be permitted and which has been paid for. Along these lines, it is recognized that the auxiliary device including possibly the telephony server may be separate or part of the control processor 40, and if separate, may communicate with the control processor 40 in order to verify the validity of an authorization code in any manner. Therefore, a consumer, by purchasing the card assembly 50, is given the requisite authorization code 53 and telephony access number so as to obtain pre-paid telephony communication services, while also possibly receiving the second portion 55 of the card assembly 50 which may include one or more different promotional items thereon. Moreover, a consumer may be provided with incentive to purchase the particular card assembly 50 of the merchant over other more traditional calling cards that do not provide any added benefit to the consumer.

In yet another embodiment, and either instead of or in addition to the telephony communication, the transaction that is facilitated by the authorization code may include a lottery purchase. In particular, the control processor 40 may store a predefined quantity of lottery entries and/or types of lottery games, in connection with a corresponding lottery commission, and preferably, but not necessarily pre-selected, random number lottery entries. As such, when an indication is made in connection with a payment authority that a lottery purchase is desired, the control processor 40 is able to issue at least one lottery entry 56 in response to the lottery purchase. In this regard it is recognized that the lottery entry 56 may be placed directly on the card assembly 50, such as on the second portion 55, or in some embodiments on the first portion of the card assembly 50 as the actual authorization code. Furthermore, if the control processor 40 is associated with an auxiliary device such as a lottery printing device, the authorization code and/or one or more authorization code may be provided to the user, either on the display assembly 26 or on the card assembly 50, for presenting in connection with the auxiliary device, thereby allowing the user to retrieve a more traditional lottery entry.

In yet another embodiment of the present multi-function transaction processing system 10, the transaction that is facilitated by the authorization code may include a gift card purchase. Specifically, the gift card or other purchase transaction may be facilitated either instead of or in addition to one or more other transactions such as the telephony communication. As such, it is recognized that one or more authorization codes may be provided to a consumer in connection with one or more payment authorities at the transaction terminal 20. In such an embodiment, the amount of the purchases of products or services that may be facilitated utilizing the authorization code is limited by the defined value of the user account associated with the authorization code. Additionally, a remote transaction processor may be provided, such as part of an auxiliary device, or integrated directly with the control processor 40. The remote transaction processor is structured to receive the authorization code from the user in connection with a purchase, and as an alternate means of payment for the purchase. For example, if a consumer desires to make an Internet purchase, the consumer will be able to communicate the authorization code to a participating merchant. In this regard, the authorization code provided by the consumer may authorize a specific defined amount corresponding to the desired purchase or may authorize a number of purchases up to the defined value of the user account associated with the authorization code. As such, the control processor 40 is further structured to authorize the purchase in accordance with the authorization code and the associated account value without the need to provide access to personal information associated with the user making the purchase. Indeed, the user making the purchase is able to maintain a substantial degree of anonymity and security with regard to their credit card information, while still being able to achieve the desired purchase. Moreover, a consumer without access to credit is able to make a cash purchase over the internet or telephone or in store by providing an appropriate payment to a merchant having a transaction terminal 20, and through the entry of an external payment verification, obtaining an authorization code that may be communicated in connection with the telephone or internet or in-store purchase. This purchase transaction also does not have to be achieved by the consumer actually purchasing the card assembly and may be provided to a third party as a gift or otherwise.

The control processor 40 of the present invention is also preferably structured to maintain records of an activity of the transaction processor 30 and/or communications between the transaction processor 30 and the control processor 40. As a result, a merchant utilizing the transaction terminal is able to obtain records of payment authorities authorized and communicated to the control processor 40, and can identify the effectiveness of the transaction terminal 20 through its activity and through information relating to additional commercial transactions that are promoted by the transaction terminal 20. In this regard, it is recognized that either directly through the transaction terminal 20 or through other conventional means, such as a network interface, communication with the control processor 40 and/or its operators, such as by e-mail transactions and the like, can be achieved, thereby providing the user with substantial account and record keeping information and usage reports. Additionally, the transaction terminal 20 may be provided to a merchant in connection with a plurality of bundled services, such as personal long distance telephone access for use in the operation of the business, Internet access, electronic mail facilities, and the like, thereby providing an overall, beneficial package of services for the merchant.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. A multi-function transaction processing system comprising:
 a) a transaction terminal, said transaction terminal including at least two data entry facilities and a transaction processor;
 b) said transaction processor of said transaction terminal being communicatively associated with at least a control processor;
 c) a first of said data entry facilities including a payment authority input structured to accept a payment authority;
 d) a second of said data entry facilities including a customer data entry facility having a customer interface structured to be accessed by a customer;
 e) at least one display associated with said second data entry facility;

f) said transaction processor responsive to customer inputs via said customer interface of said second data entry facility and structured to provide the customer with a plurality of selections on said display;

g) said control processor structured to define a user account in accordance with a customer selection and to issue an authorization code associated with said user account;

h) said user account including a defined value at least partially defined by said payment authority, said authorization code structured to facilitate a transaction in accordance with said defined value; and i) a printer assembly communicatively associated with said transaction terminal and structured to generate a card assembly.

2. A multi-function transaction processing system as recited in claim 1 including a plurality of said customer data entry facilities structured to provide a plurality of customers with said plurality of selections.

3. A multi-function transaction processing system as recited in claim 1 wherein said first data entry facility is structured to be interfaced by an attendant.

4. A multi-function transaction processing system as recited in claim 3 wherein said first data entry facility is oriented towards a different direction than said second data entry facility so as to facilitate simultaneous utilization of said transaction terminal by the customer and the attendant.

5. A multi-function transaction processing system as recited in claim 4 wherein said printer assembly is oriented towards said first data entry facility so as to provide said card assembly to the attendant accessing said first data entry facility.

6. A multi-function transaction processing system as recited in claim 5 including a plurality of said customer data entry facilities structured to provide a plurality of customers with said plurality of selections.

7. A multi-function transaction processing system as recited in claim 6 wherein at least one of said customer data entry facilities includes said printer assembly.

8. A multi-function transaction processing system as recited in claim 1 wherein said control processor is remotely connected with said transaction processor.

9. A multi-function transaction processing system as recited in claim 1 wherein said control processor is locally associated with said transaction processor.

10. A multi-function transaction processing system as recited in claim 1 wherein said control processor is included in said transaction terminal.

11. A multi-function transaction processing system as recited in claim 1 wherein said user account comprises a pre-paid telephony account.

12. A multi-function transaction processing system as recited in claim 11 wherein said plurality of selections provide to the customer by said transaction processor comprise pre-paid telephony plans, said customer inputs structured to identify said plan that corresponds said customer selection.

13. A multi-function transaction processing system as recited in claim 12 wherein said transaction processor is structured to query the customer so as to elicit said customer inputs and facilitate identification of a preferred one of said customer selections.

14. A multi-function transaction processing system as recited in claim 1 wherein said user account comprises a gift card purchase account.

15. A multi-function transaction processing system as recited in claim 1 wherein said user account comprises a pre-paid wireless telephony account.

* * * * *